F. S. FLOETER.
CLUTCH.
APPLICATION FILED AUG. 2, 1920.

1,380,789.

Patented June 7, 1921.

Frederick S. Floeter INVENTOR

BY Geo. B. Willcox ATTORNEY

UNITED STATES PATENT OFFICE.

FREDERICK S. FLOETER, OF SAGINAW, MICHIGAN.

CLUTCH.

1,380,789.            Specification of Letters Patent.          Patented June 7, 1921.

Application filed August 2, 1920. Serial No. 400,717.

*To all whom it may concern:*

Be it known that I, FREDERICK S. FLOETER, a citizen of the United States, residing at Saginaw, in the county of Saginaw and State of Michigan, have invented certain new and useful Improvements in Clutches; and I do hereby declare the following to be a full, clear, and exact description of the invention, such as will enable others skilled in the art to which it appertains to make and use the same.

This invention relates to devices for actuating friction or dental clutches and the like to throw the clutch members into and out of engagement, and the improvement pertains more particularly to mechanism whereby the clutch may be quickly engaged with powerful gripping action, or released with only a small amount of relative movement between the two clutch members.

The object of my invention is to provide a clutch-actuating handle and means operated thereby, so arranged that when the handle is in a straight outwardly projecting position, the two clutch members will be in engagement, or vice versa, and when the handle is in a sidewise or tilted position the clutch members will be out of engagement, or vice versa.

One adaptation of my invention is in the operation of friction or dental clutches on the aprons of metal-working lathes and the like.

Heretofore to throw the feed mechanism into or out of gear, it has been customary to tighten a knurled nut or small wheel on the apron of the lathe; but very commonly these nuts become worn, or would bind so that the lathe operator frequently tightened the nut with a wrench or hammer, thereby losing time or damaging the lathe in an effort to secure effective gripping of the friction clutch by which the lathe feed is actuated.

In adapting my improvement to the apron of a lathe, I employ a handle or lever instead of the above-mentioned nut.

When the handle projects horizontally or axially with respect to the axis of the friction clutch, the clutch is engaged, but when the handle is tilted away from its axial position, in whatever direction, it will disengage the clutch.

With the foregoing and certain other objects in view which will appear later in the specification, my invention comprises the devices described and claimed and the equivalents thereof.

In the drawings, Figure 1 is a part longitudinal sectional view of a clutch with my tightening device applied thereto, the clutch-operating handle being shown in its axial position, and the clutch members engaged.

Figure 1:
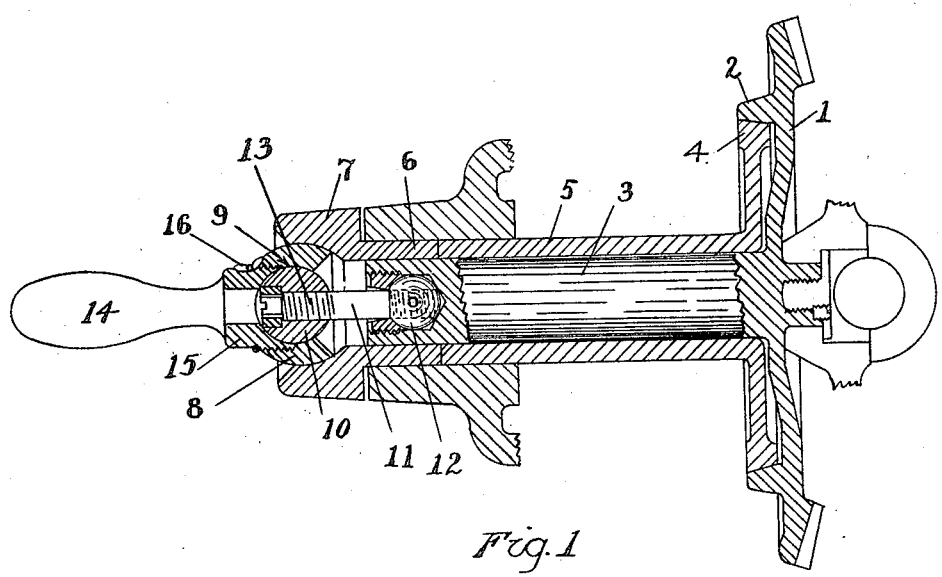

In the drawings, 1 represents a gear having a clutch member 2 and an integral cylindrical stem 3.

The other clutch member 4 is provided with a hollow cylindrical stem 5 fitted outside the stem 3. This outer hollow stem 5 extends preferably over only part of the length of the stem 3, the remainder of stem 3 being surrounded by a corresponding hollow stem 6 of a ball seat cup 7, the ends of the hollow stems 6 and 7 abutting, as shown in the drawings.

Received within the ball seat 7 is a hollow ball 8. This ball has an internal part-spherical ball seat 9, in which is seated a ball 10.

The center of ball 10 does not coincide with the center of the surrounding ball 8, but is eccentric thereto, as shown in Fig. 1.

The internal ball 10 is connected to the end of stem 3 by a link 11, one end of the link being fitted with a ball-and-socket joint 12 in the end of stem 3, the other end of the link being threaded and screwed into a threaded aperture 13 in ball 10.

Since balls 8 and 10 are located eccentrically with respect to each other, if the outer ball 8 is turned in the ball seat cup 7, link 11 will thereby move slightly lengthwise and will operate to release or tighten the clutch members 2 and 4.

To so turn ball 8, I provide an operating handle 14 having a threaded boss 15 received in the threaded aperture of ball 8, the aperture being large enough to permit inserting ball 10. The end of the threaded boss 15 is also formed with a part-cylindrical cavity to fit the surface of ball 10. The handle may be prevented from unscrewing by means of a key 16.

When the handle is in the position shown in Fig. 1, that is, axial or approximately so, with respect to the stem 3, the two balls 8 and 10 are in such position that the link 11 and stem 3 are drawn to the left to their fullest extent, as shown in Fig. 1 and the clutch members 2 and 4 are consequently clamped together.

Figure 2:
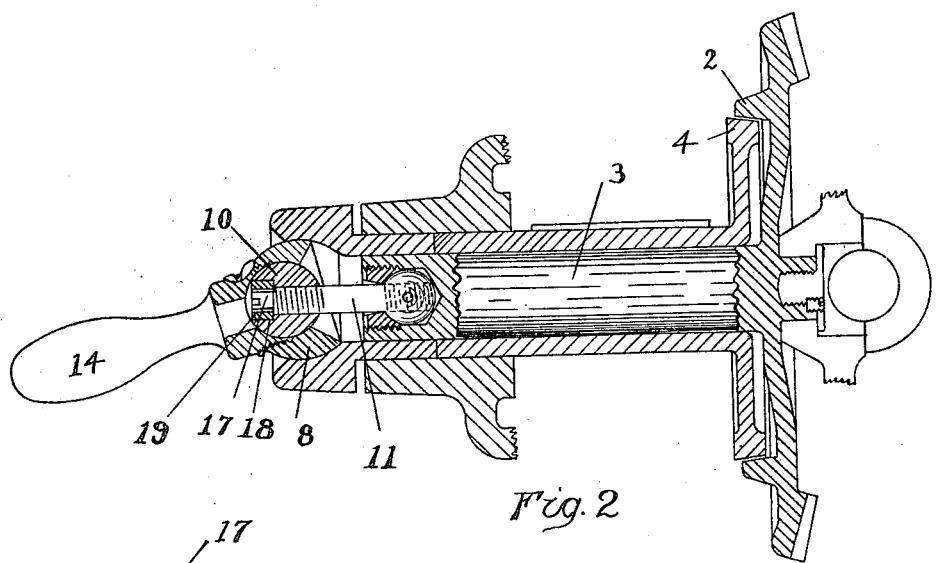
Fig. 2 is a similar view, showing the handle in its tilted position and the clutch members disengaged.

When the handle 14 is tilted away from its approximately axial position, the relative positions of balls 8 and 10 are changed and the link 11 and stem 3 are forced to the right, thereby disengaging the clutch members 2 and 4, as shown in Fig. 2.

Figure 3:
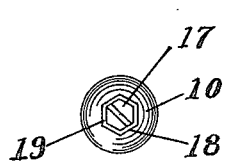
Fig. 3 is an end view of the adjusting link and inner ball.

To compensate for wear in the bearing surfaces and to afford proper adjustment of the clutch movement with respect to the movement of the handle, I provide means for lengthening or shortening the link 11, as shown in Figs. 2 and 3, where 17 is the outer end of link 11, this end preferably being of polygonal form and of smaller diameter than the diameter of the body of link 11.

Ball 10 is formed with a polygonal recess 18, and within recess 18 and outside the polygonal end 17 of stem 11 is inserted a hollow polygonal sleeve 19, this sleeve acting as a lock to prevent the link 11 turning while sleeve 19 is in place.

To adjust the working length of link 11, it is only necessary to screw it into the ball 10 to the desired adjusted position and then drop the polygonal sleeve 19 into place to prevent further relative turning of the ball and sleeve.

The threaded boss 15 on the handle 14 prevents displacement of the sleeve 19.

By the means above described, I have produced a clutch-operating device that is simple, relatively inexpensive and capable of exerting great power with a very small amount of movement of the clutch devices and adapted to be operated by a handle which by its position indicates at a glance whether the clutch is in or out of engagement, that is to say; when the handle projects straight out, or substantially so, the clutch is engaged, but in any other position the clutch is known to be out of engagement.

The handle may be moved in any direction away from its central position to disengage the clutch, namely, upwardly, downwardly, or sidewise, whichever is most convenient to the operator.

Having thus described my invention, what I claim and desire to secure by Letters Patent is:

1. In combination, a clutch-member having an integral stem, a link having one end swiveled to said stem, a ball fixed to the other end of said link, a hollow ball inclosing said first-mentioned ball and eccentric thereto, an operating handle secured to said hollow ball, a cup formed with a seat to receive said hollow ball, a second clutch-member, a hollow cylindrical stem connecting said cup and said second clutch member, for the purposes set forth.

2. In combination, a clutch-member having an integral stem, a link having one end swiveled to said stem, a ball adjustably secured to the other end of said link, a hollow ball inclosing said first-mentioned ball and eccentric thereto, an operating-handle secured to said hollow ball, a cup formed with a seat to receive said hollow ball, a hollow cylindrical stem on said cup, a second clutch-member, a hollow cylindrical stem on said second clutch-member and abutting against the stem of said cup.

3. In combination, a clutch-member having an integral stem, a link secured at one end to said stem, a ball adjustably secured to said link, a hollow ball inclosing said first-mentioned ball and eccentric thereto, a cup formed with a seat to receive said hollow ball, a second clutch-member, a stem connecting said cup and second clutch-member, and means for rotating said hollow ball with respect to said first-mentioned ball, for the purposes set forth.

In testimony whereof, I affix my signature.

FREDERICK S. FLOETER.